(12) United States Patent
Grossman et al.

(10) Patent No.: US 8,171,431 B2
(45) Date of Patent: May 1, 2012

(54) HANDLE FLAGS

(75) Inventors: Tovi Grossman, Toronto (CA); Patrick M. Baudisch, Seattle, WA (US); Kenneth P. Hinckley, Redmond, WA (US); William A. S. Buxton, Toronto (CA); Raman Sarin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 697 days.

(21) Appl. No.: 11/868,058

(22) Filed: Oct. 5, 2007

(65) Prior Publication Data

US 2009/0094560 A1    Apr. 9, 2009

(51) Int. Cl.
*G06F 3/14* (2006.01)
*G06F 3/17* (2006.01)

(52) U.S. Cl. ............ 715/863; 707/3; 345/156; 345/173; 345/174; 345/764

(58) Field of Classification Search .......... 715/200–277; 700/701–866; 709/201–229; 705/50–79; 345/30–111, 156, 173, 174, 764; 348/206–231.9; 707/3
See application file for complete search history.

(56) References Cited

U.S. PATENT DOCUMENTS

| | | | | |
|---|---|---|---|---|
| 7,446,754 B2* | 11/2008 | Ausbeck, Jr. | .................. | 345/156 |
| 7,656,394 B2* | 2/2010 | Westerman et al. | .......... | 345/173 |
| 2002/0089541 A1* | 7/2002 | Orbanes et al. | ............... | 345/764 |
| 2007/0038610 A1* | 2/2007 | Omoigui | ........................... | 707/3 |
| 2009/0015566 A1* | 1/2009 | Ausbeck, Jr. | .................. | 345/174 |
| 2009/0051660 A1* | 2/2009 | Feland et al. | .................. | 345/173 |

* cited by examiner

*Primary Examiner* — Ruay Ho
(74) *Attorney, Agent, or Firm* — Lee & Hayes, PLLC

(57) ABSTRACT

The claimed subject matter provides techniques to effectuate and facilitate efficient and flexible selection of display objects. The system can include devices and components that acquire gestures from pointing instrumentalities and thereafter ascertains velocities and proximities in relation to the displayed objects. Based at least upon these ascertained velocities and proximities falling below or within threshold levels, the system displays flags associated with the display object.

16 Claims, 12 Drawing Sheets

HANDLE FLAGS

BACKGROUND

Pen-based systems allow for fluid and expressive input, making them effective tools for many tasks, such as note taking and design sketching. In inking applications it is easy and intuitive to create ink strokes, since it is similar to physically writing on paper. However, the inherent differences of pen-based interfaces add complications to the task of ink selection which need to be addressed.

The first difficulty is in informing the system that actions are not to be considered ink per se, but are intended to define a selection. Without supplementary buttons, users are often required to make roundtrips to bordering tool bars to transition between these modes, which could have undesirable costs. Furthermore, mode errors inevitably occur when the user forgets to activate the selection mode, activates it by accident (e.g., by mistakenly pressing the pens barrel button while writing), or forgets to turn off "selection mode" when done selecting objects.

The other difficulty is specifying the desired selection to the system. Document objects, such as diagrams and words, can consist of multiple individual ink strokes, potentially resulting in unexpected results when the user tries to select them. For example, a user may try to select and move a word, only to find that one stroke of a character, such as a dot above an 'i' was left behind. Furthermore, words and illustrations may be densely clustered together or even overlap. Selecting a specific set of ink strokes within such data with a traditional lasso tool, if possible at all, can require a constrained "steering task", which can be time-consuming and error-prone.

Numerous techniques have been developed for selection in pen-based interfaces. In early systems, the scope of a command was defined by encircling desired objects to specify a "collective scope". This type of freeform lasso selection has been commonly employed, but a difficulty with such selection techniques is that in a dense area of ink stokes, for example, users may need to follow a constrained path to ensure that only their ink strokes are selected. Accot's steering law (e.g., a predictive model of how quickly one can navigate, or steer, through a two-dimensional tunnel/maze) would suggest that the performance time of this task can be constrained by the width of the "tunnel". Accordingly, the narrower the tunnel, the greater the performance time required to complete the task.

While lassoing may be the most common approach, alternatives have also be designed and studied. Tapping requires users to tap down on a desired selection. Tapping has been shown to perform well in comparison to lasso selection when selecting discrete and non-cohesive targets that cannot be circled with a single lasso. However, this approach is not so appropriate for objects consisting of multiple ink strokes, as in such cases a system must typically interpret the desired scope of the user's selection.

Crossing is another alternative that is similar to lassoing but instead of circling the desired selection, the user crosses it. This technique has been explored in pen-based interfaces; however for selection of ink, it can be difficult to cross each atomic element of a compound selection with a single stroke.

An impediment associated with the above selection techniques is the continuous nature of ink data. A document containing freeform ink lacks delimiters which typically defines characters, words and diagrams, and so a system's knowledge of which strokes are related and how remains uncertain. This can cause unexpected results when the user tries to select from this input. For instance, a user may attempt to select and move a word, only to find that one stroke of a character is left behind or orphaned.

One typical solution to this difficulty has been to use grouping—where multiple objects are combined to form explicit and system recognized higher-level structures. In such applications, the grouping can be done implicitly by the system—the system attempts to interpret the data and forms groups of strokes, such as words, sentences, or diagrams. A potential problem with such systems arises when objects are not grouped correctly. For example, a stroke may get mistakenly grouped and selected with a word when it actually belongs to a nearby diagram. Furthermore, once groups are formed, it can be difficult for the user to select elements from the group, such as, for instance, the first character of a word.

Another difficulty with traditional selection techniques has been that ink data commonly contain overlapping strokes, such as text appearing over diagrams. In many cases this can make selections difficult or even impossible. One approach to counter this deficiency has been to employ a tumble and splatter technique spread over overlapping objects to allow users access to desired objects. However, these techniques do not address pen-based interfaces specifically, and moreover, require the user to enter an explicit mode using a button.

Generally, the user must inform the system that their actions with the pointing device (e.g., mouse, stylus, pen, and the like) should be interpreted as either ink or selection, before the associated stroke occurs. The traditional technique for doing so is to travel to a bordering toolbar to click on an icon. Unfortunately, this is time-consuming, physically demanding, and can distract the user's attention from their primary task. Nevertheless, a number of alternatives are available, such as, for instance, using a barrel button, holding down a stylus or pen for a dwell timeout period, pressing a supplementary button with a non-dominant hand, using pressure, and using the eraser of a pen. Comparative investigations have indicated that pressing a button with a non-dominant hand offers the fastest performance, and best trade-off with errors.

Button-free alternatives are also available. Gestural user interfaces typically interpret implicitly the intent from a user's actions, so an explicit mode transition is not generally required. Research has indicated that users have a general preference for such "inferred mode protocols". However, further research has also suggested that users also preferred an explicit mode change over an inferred mode protocol by a margin of two to one. A challenge associated with gestural interfaces is that misinterpretations can cause unexpected results. Furthermore, such interfaces tend to introduce hidden states and specific orderings of operations that can be counterintuitive or unclear to the user.

A tracking menu is an example of a non-gestural approach that can give users localized access to commands and modes, but it is a mode itself that must be explicitly enabled, and cannot be fluidly integrated with ink input. Hover widgets allow users to access system functionality such as mode switches through localized gestures. The gestures can be carried out in the tracking state of the device, distinguishing them from ink input. Regardless of the technique utilized to transition between modes, if the user forgets or misclassifies the current state of a system, modes can result in errors—errors that can occur even with kinesthetically maintained modes.

SUMMARY

The following presents a simplified summary in order to provide a basic understanding of some aspects of the disclosed subject matter. This summary is not an extensive over-view, and it is not intended to identify key/critical elements or to delineate the scope thereof. Its sole purpose is to present some concepts in a simplified form as a prelude to the more detailed description that is presented later.

The subject matter as claimed, called handle flags, provides techniques for selecting and performing commands on objects (e.g., ink objects, text objects, graphical objects, and the like) in applications, such as inking applications. Handle flags posses a number of qualitative properties that can aid resolve the difficulties currently associated with object selection: the technique is generally button-free, and transition to and/or from selection mode typically is implicit, users can add and/or remove objects from their selection scope, overlapping and occluding objects can be selected, and elements within group structures, such as characters of a word, can be selected. Demonstrations of the claimed subject matter indicate that utilization of the subject matter as claimed can provide significant quantitative performance gains over baseline techniques utilizing toolbars to transition to a lassoing mode, for example. Also further demonstrations of the subject matter as claimed have indicated additional performance gains in comparison with utilization of a non-dominant hand button to transition to a lassoing mode, a technique previously identified as being efficient.

In accordance with one illustrative aspect, the claimed subject matter provides a system implemented on a machine that effectuates and facilitates efficient and flexible selection of display objects. The system includes devices and components that can obtain or receive from interfaces gestures related to display objects (e.g., inked characters, words, diagrams, and the like), determine velocities or proximities in relation to the display objects, and based at least in part on the determined velocities and/or proximities the component, display flags associated with the display object on a visual display.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
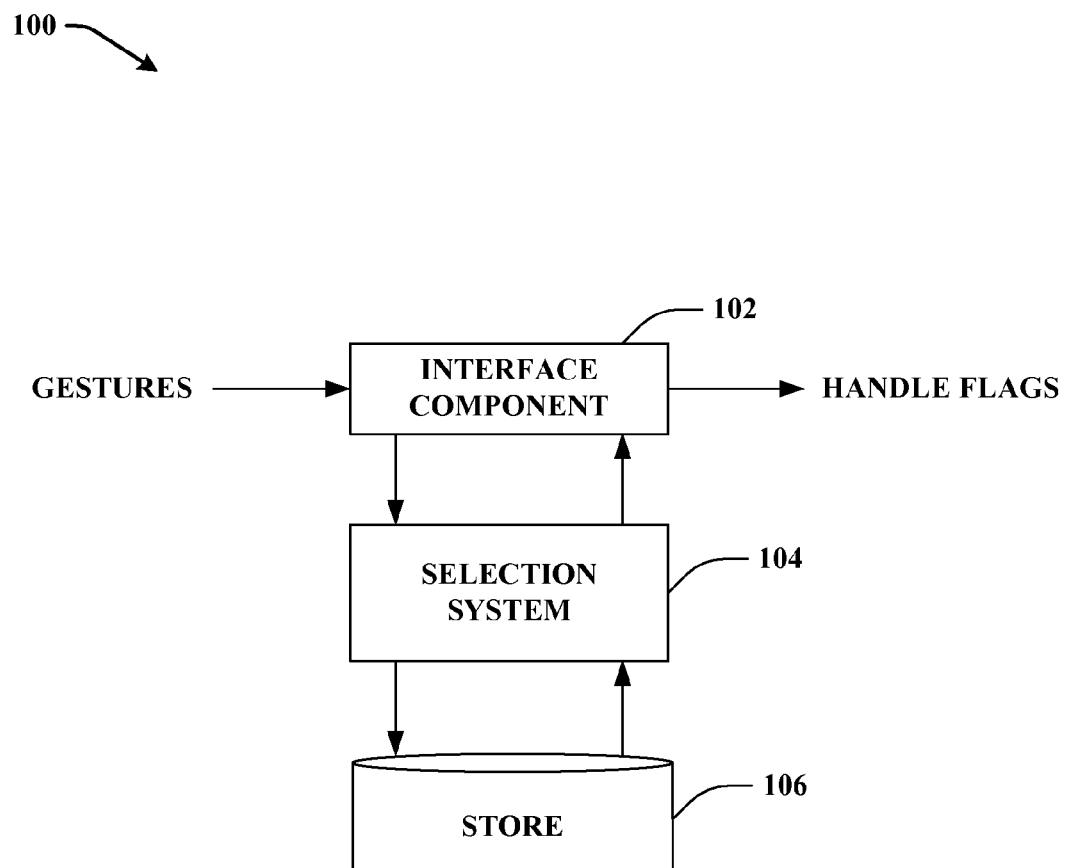
FIG. 1 illustrates a machine-implemented system that effectuates and facilitates efficient and flexible selection of display objects in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It should be noted at the outset that while the subject matter as claimed is elucidated for the purposes of clarity, simplicity of exposition, and comprehension, in the context of Tablet PC's, pen-based input devices, and inking applications, the claimed subject matter is not so limited. The subject matter as claimed can find applicability in a plethora of contexts, mechanisms, and applications beyond the herein explicated paradigms. For instance, the subject matter as claimed can be applied to other types of documents created by an application (e.g., word processing, spreadsheet, graphic, etc.) without departing from the intent, spirit, or ambit of the claimed subject matter. Accordingly, any and all such applicability, and derivations thereof, is deemed to fall within the purview and scope of the subject matter as claimed.

The subject matter as claimed (referred to herein as "handle flags") provides and utilizes a technique designed to alleviate the difficulties currently associated with object selection. The technique can utilize localized widgets that can, for example, be employed within inking modes, without the need for supplementary buttons. Handle flags can fade in or out when a pointing indicator (e.g., mouse cursor, stylus cross-hair, . . . ) drops below, or accelerates beyond, a velocity threshold over an object of interest. To reduce occlusions and/or false activations, handles can be offset from the pointing indicator location (e.g., mouse cursor location, stylus cross-hair location, and the like). Each handle can represent an associated selection, and the act of providing indication (e.g., via tapping, flicking, or hovering modalities) in the proximity, or on the handle, can activate contextual pop-up menus that can perform the selection.

The claimed subject matter can provide at least two benefits in comparison to traditional selection tools. First, users do not need to travel to toolbars to transition to selection modes, or worry about using supplementary buttons. Second, lasso strokes that can typically be employed to define selections are not required, meaning performance of the techniques employed by the claimed subject matter should be unaffected by the nature of the desired target and its surrounding environment.

The true benefit of the claimed subject matter is evident when users wish to make selections from the system's set of potential selections, for which a handle flag already exists. While sketch recognition techniques can do a reasonable job at generating such selections, a system typically cannot be expected to predict each and every one of a user's potential selections. Although new selections can be created through the claimed subject matter's compound selection operations, in some cases it can be easier to use a traditional tool, such as a lasso. Thus, the claimed subject matter does not necessarily eliminate traditional tools, but rather provides a supplement and augmentation that compliments current tool sets. Accordingly, when a user wishes to make a new selection, the user can choose to use a lasso tool. However, once any such selection is made, it can be added to the set of potential, but previously or contemporaneously established, selections. Thus, users can thereafter make use of the selection through its corresponding handle flag, leveraging the handle flag's qualitative and quantitative benefits.

The claimed subject matter can provide a handle for accessing potential selections in an inking application. These potential selections can include a set of selections stored by the system. The set of potential selections can include selections previously employed by a system user; system inferred selections based at least in part on recognition heuristics; and individual stokes that can comprise an object. For instance, if a user writes "hello" the system can recognize the entire word as a potential selection, and/or can consider each individual stroke which makes up the word as potential selections. Accordingly, when the user approaches (e.g., brings a pointing or selection device within the ambit of potential selections) handle flags can fade in or out. Users can thereafter provide indication to the handle (e.g., tap on the handle) associated with their desired selection to select or perform a command on it.

FIG. 1 illustrates a machine implemented system 100 that effectuates and facilitates efficient and flexible selections of object in accordance with an aspect of the claimed subject matter. System 100 can include interface component 102 (hereinafter referred to as "interface 102") that can continuously and operatively and/or sporadically but intermittently receive or obtain input in the form of gestures, for example, from a tablet and associated stylus input device that can be associated with a processing device (e.g., computer workstation, Personal Digital Assistant (PDA), laptop computer, handheld device, smart phone, cell phone, ordinary or digitally watermarked paper utilized with a pen capable of digitizing its movements, industrial automation device, industrial and/or consumer electronic equipment, multimedia recording and/or playback devices, etc.). On receipt of input in the form of gestures interface 102 can convey this information to selection system 104 for appropriate resolution. Interface 102, after receipt of input from selection system 104, can output affiliated handle flags associated with displayed objects. Additionally and/or alternatively, interface 102 can receive data for a multitude of other sources such as client applications, services, users, clients, devices, and/or entities involved with a particular transaction, a portion of a transaction, and thereafter can convey this information to selection component 104 for subsequent analysis.

Interface 102 can provide various adapters, connectors, channels, communication pathways, etc. to integrate the various components included in system 100 into virtually any operating system and/or database system and/or with one another. Additionally, interface 102 can provide various adapters, connectors, channels, communication modalities, and the like, that provide for interaction with various components that can comprise system 100, and/or any other component (external and/or internal), data, and the like associated with system 100.

As depicted system 100 can include selection system 104 that can be in operative communication with interface 102. Selection system 104 can employ localized widgets to provide handle flags that can fade in or out when a pointing indicator (e.g., mouse cursor, stylus cross-hair, and the like) drops below, or accelerated beyond, a threshold velocity and/or approaches or comes in close proximity to an item of interest. In order to reduce occlusions and/or false activations, selection system 104 can ensure that generated handles are offset from the pointing indicator location (e.g., stylus cross-hair location, . . . ). Additionally, selection system 104 can associate particular selections with each generated handle such that when a user provides indication (e.g., via an act of flicking, tapping, hovering, etc.) in the vicinity, or on a provisioned handle itself, can activate contextual pop-up menus associated with the handle and that can perform the acts affiliated with the selection.

Accordingly, selection system 104 can provide a handle for accessing each potential selection in an application (e.g., inking application, word processing application, graphical package, spreadsheet application, and the like). These potential selections can be a set of selections stored by selection system in store 106. The set of potential selection can include selections previously used by a user; system inferred selections based at least in part on recognition heuristics; and individual strokes. For example, if a user writes "telephone", selection system 104 can recognize the entire word as a potential selection. Further, selection system 104 can also recognize that each individual stroke that makes up the word "telephone" can also be considered potential selections. Consequently, when a user (e.g., through utilization of a pointing modality) approaches such selections, selection system 104 can cause handle flags to fade in or out. Users can then provide indication (e.g., tapping, clicking, flicking, etc.) on the handle associated with their desired selection to select or perform a command on it.

Selection system 104 in the generation of handle flags has adhered to the following design principles and qualitative properties. Since in many pen-based systems buttons are not typically available, and further while in some instances supplementary buttons, such as soft keys, are available, selection system 104 has been designed to not generally require the use of buttons. Further, since explicitly moded interfaces are prone to mode errors and gestural techniques that use an inferred mode protocol are prone to misinterpretation, selection system 104 has been designed so that it can receive or obtain indication, for instance, through tapping, clicking, flicking, etc. on a handle flag which can thus integrate the transition to selection mode and the definition of the selection scope into a single action. In this manner, selection system 104 can minimize the risk of mode errors, while still allowing users to explicitly communicate their intentions to the system.

Additionally, research has demonstrated the drawbacks of requiring roundtrips to non-localized widgets. As such selection system 104 can provide handle flags that are localized, appearing in place when a pointing indicator (e.g., mouse cursor, stylus cross-hair, and the like) approaches an area containing an item of interest. Moreover, since explicit groupings can make it difficult to select individual elements within a group, selection system 104 utilizes a more flexible concept of groupings wherein individual objects can belong to any number of groups. Accordingly, selection system 104 can generate and associate handle flags for each of these groups, thus giving the user the flexibility to select the intended scope of their selection.

Furthermore, because of overlapping and intersecting ink strokes, it can be difficult or impossible to make selections in standard inking applications. Thus, selection system 104 can produce and affiliate handle flags and thereafter position such handle flags using a layout algorithm which guarantees that no handles occlude one another, even if the associated ink selections do.

In addition, since without supplementary buttons it can be difficult to define whether a selection should be added to a current selection scope, removed from the current selection scope, or used to begin a new selection scope. Selection system 104, when generating and affiliating handle flags, can provide functionality to support compound selections (e.g., add selections, remove selections, and/or create new selections).

System 100 can also include store 106 that can include any suitable data necessary for selection system 104 to facilitate it aims. For instance, store 106 can include information regarding potential selections, user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 106 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 106 of the subject systems and methods is intended to comprise, without being limited to, these and any other suitable types of memory. In addition, it is to be appreciated that store 106 can be a server, a database, a hard drive, and the like.

Figure 2:
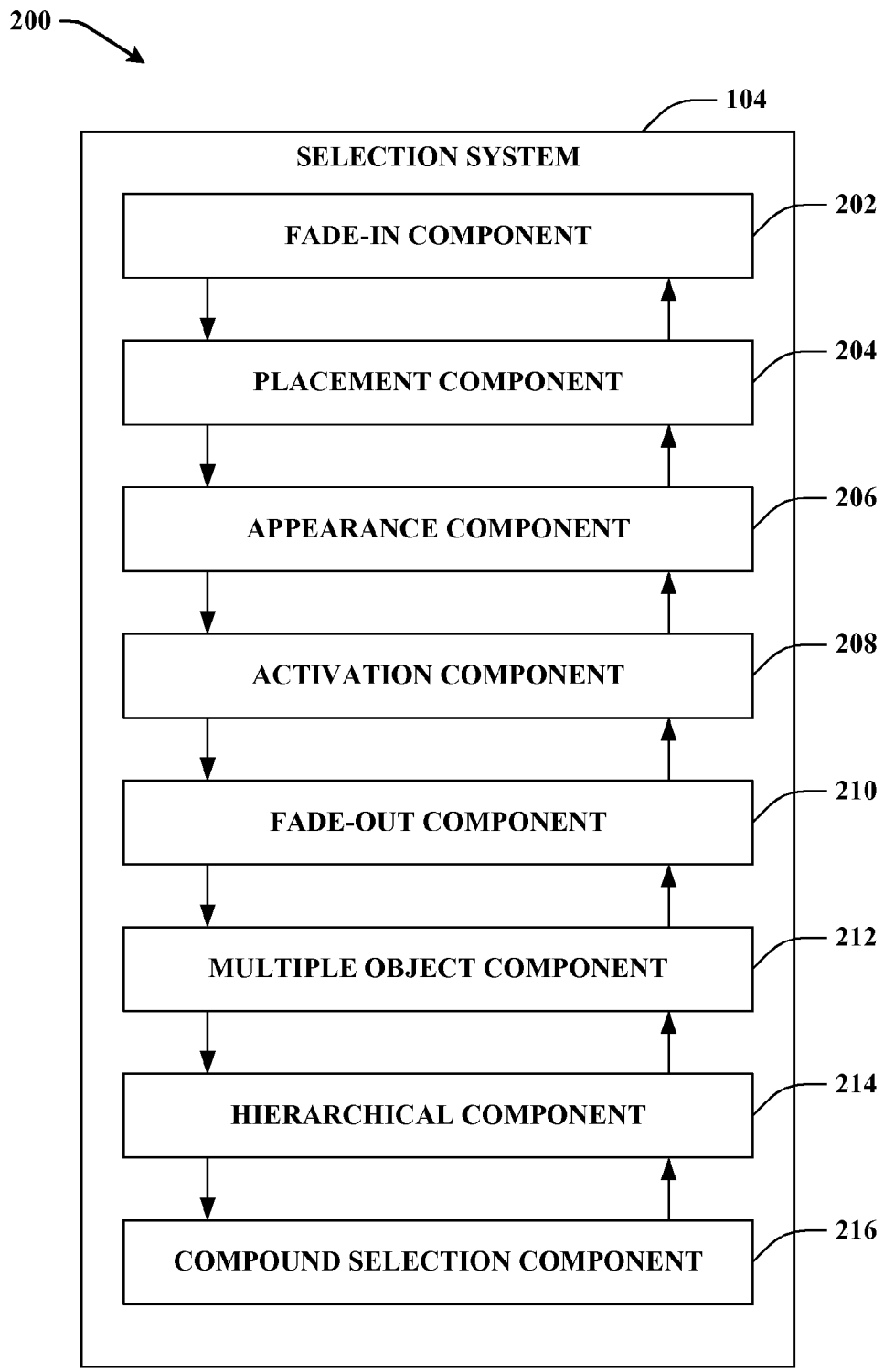
FIG. 2 depicts machine-implemented system that effectuates and facilitates efficient and flexible selection of display objects in accordance with one aspect of the claimed subject matter.

FIG. 2 provides a more detailed depiction 200 of selection system 104 in accordance with an aspect of the claimed subject matter. Selection system 104 can include fade-in component 202 that can display generated handle flags when a user wishes to utilize them. While fade-in component 202 typically cannot with certitude predict when such an event will occur, fade-in component 202 via utilization of a heuristic can provide a reasonable approximation of when such an event might occur. Further, selection system 104 can also include placement component 204 that determines, if an unwanted handle appears, whether or not the handle occludes an area where the user wishes to begin an ink stroke, and where a user could accidentally access the handle flag (e.g., accidentally clicking on the handle flag). To prevent this, placement component 204 can situate generated handle flags at an offset from the point on the ink stroke (or object) closest to the initial pen location. Placement component 204 typically displaces handle flags down and to the left for right-handed users, and down and to the right for left-handed users. This ensures that handle flags are not occluded and the user will notice them when they appear.

Additionally, selection system 104 can include appearance component 206. In order to aid the association between handles and inked strokes (or displayed objects), appearance component 206 can render handles as thumbnail images of the actual stokes that comprise the displayed object. The dimensions of the handles can be proportional to the dimensions of a bounding box of the actual displayed object (e.g., ink strokes). Further, selection system 104 can also include activation component 208 that continuously monitor for indications (e.g., tapping, clicking, flicking, etc.) provided by the user that activation is required. Activation component 208 upon detection of one or more indication associated with a displayed handle flag can display a radial pop-up menu within which the user can select associated objects, or perform commands on the object.

Selection system 104 can also include fade-out component 210 that can dismiss unwanted handles where handles inadvertently fade in without interrupting the user's flow of interaction. Selection system 104 can further include multiple-object component 212 that can measure the velocity and proximity of a pointing indicator (e.g., mouse cursor, stylus cross-hair, . . . ) in an area containing a dense population of objects (e.g., multiple ink strokes). Based on such information, multiple-object component 212 can display handle flags for each and every one of the objects included in the dense population of object such that no two handle flags overlap and occlude one another.

Moreover, selection system 104 can additionally include hierarchical component 214 that produces structures that contain all potential selections. While it can be typical that users want to select object groups rather than individual items and artifacts that comprise the object groups, there can be instances where users wish to access constituent parts of an object. Accordingly, hierarchical component 214 can dissect objects into their constituent parts and thereafter can construct hierarchies that can provide users with multiple potential selections from which to choose.

Selection system 104 can also include compound selection component 216 that allows users to choose from three selection options—new selection, add selection, and remove selection. Such selection features provide users the flexibility to alter the scope of their selection after it has been initially made.

Figure 3:
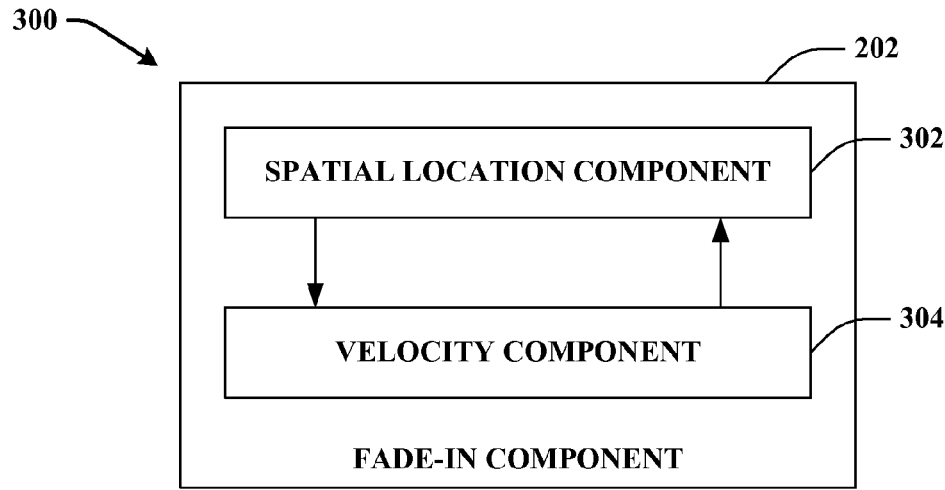
FIG. 3 provides a more detailed depiction of an illustrative fade-in component that effectuates and facilitates efficient and flexible selection of display objects in accordance with an aspect of the claimed subject matter.

FIG. 3 provides a more detailed depiction 300 of fade-in component 202 in accordance with an aspect of the claimed subject matter. As illustrated fade-in component 202 can include spatial location component 302 and velocity component 304. Spatial location component 302 can monitor activity associated with a pointing indicator (e.g., mouse cursor, stylus cross-hairs, pen proximity, . . . ) and can determine whether or not the pointing indicator is in the proximity or vicinity of an object (e.g., ink strokes). For instance, spatial location component 302 can provide indication to velocity component 304 that pointing indicator is within 10 pixels of a particular object. On receipt of such information from spatial location component 302, velocity component 304 can undertake determination as to whether the velocity of the pointing indicator has fallen below a threshold velocity (e.g., 333 pixels/second) with the pointing indicator is in a tracking state. Where spatial location component 302 and/or velocity component 304 ascertain that pointing indicator is within the proximity of an object or that the pointing indicator velocity has fall below a threshold velocity within the vicinity of an object, fade-in component can cause handles associated with the object to fade-in (e.g., displayed).

Figure 4:
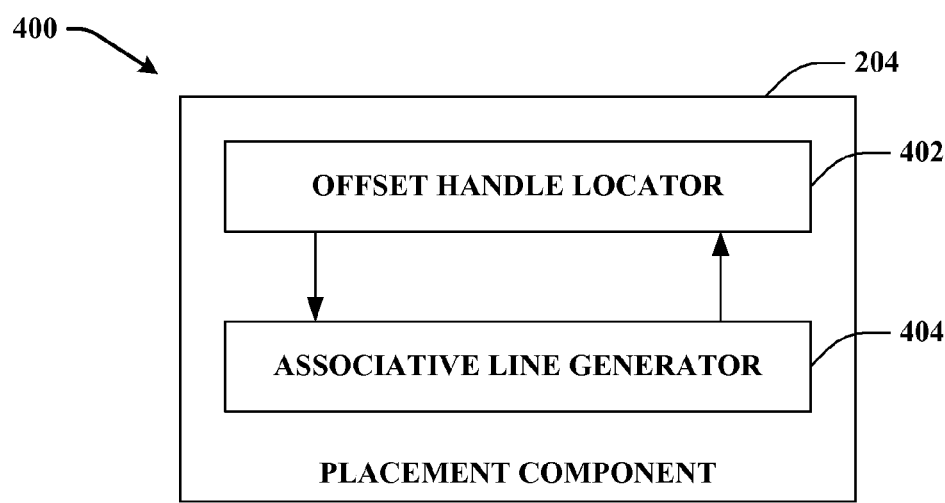
FIG. 4 provides a more detailed depiction of a placement component that facilitates and effectuates efficient and flexible selection of display objects in accordance with an aspect of the claimed subject mater.

FIG. 4 provides a more detailed illustration 400 of placement component 204 in accordance with an aspect of the claimed subject matter. Placement component 204 can alleviate a potential problem when unwanted handles appear and occlude areas where users may wish to begin inserting objects (e.g., ink strokes). Moreover, placement component 204 can obviate situations where handles appear just before a pointing instrumentality (e.g., pen, stylus, mouse, point of pressure, etc.) commences inserting a new object and the user inadvertently clicks on the unwanted handle. To this end, placement component 204 can include an offset handle locator 402 that can offset the generated handle from the original point on the object closest to the initial location of the pointing instrumentality. Thereafter, an associative line generator 404 can inscribe a line that originates from a point on the object closest to the initial location of the pointing instrumentality to the offset handle. The offset handle would typically be the location where the user would, for example, tap the handle to activate it. This prevents users from accidentally clicking a handle if they pause before inserting new objects close to existing objects. In order to accommodate right and left handed individuals, placement component 204 can be configured so that handles are generally displaced down and to the left for right handed individuals, and down and to the right for left handed users. However, as will be appreciated by those cognizant in the art other configurations can be adopted without departing from the intent, spirit, and scope of the claimed subject matter.

Figure 5:
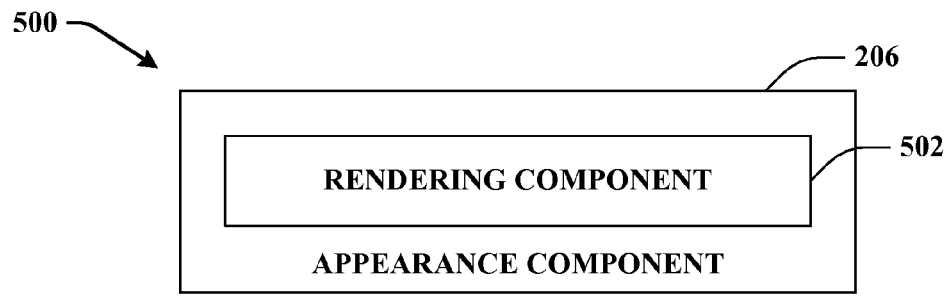
FIG. 5 provides a more detailed depiction of an appearance component that facilitates and effectuates efficient and flexible selection of display objects in accordance with an aspect of the claimed subject matter.

FIG. 5 provides a more detailed depiction 500 of appearance component 206 in accordance with an aspect of the claimed subject matter. Appearance component 206 can include rendering component 502 that effectuates and facilitates associations between handles and objects, such as ink strokes. Rendering component 502, in order to aid such associations, can render handles as thumbnail images of the object or ink strokes which they represent. Rendering component 502 can proportionately dimension the thumbnail image so that the image can be proportional to the dimensions of the bounding box of the actual object or ink strokes.

Figure 6:
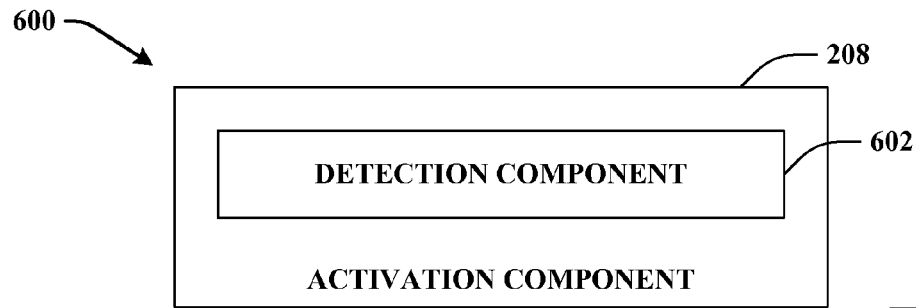
FIG. 6 provides a more detailed depiction of an activation component that facilitates and effectuates efficient and flexible selection of display objects in accordance with an aspect of the subject matter as claimed.

FIG. 6 provides further illustration 600 of activation component 208 that continuously or intermittently monitors for activation of handle flags in accordance with an aspect of the claimed subject matter. As depicted, activation component 208 can include detection component 602 that keeps track of pointing instrumentalities employed by users to add, insert, remove, or modify objects (e.g., ink strokes). Detection component 602 can recognize when a user wishes to activate a particular handle (e.g., user can use a tapping motion with a pen over the handle of interest, . . . ). Upon recognition of a users wish to activate a handle, detection component 602 can display, for example, a radial pop-up menu that allows the user to select the associated object, or perform commands on the object.

Figure 7:
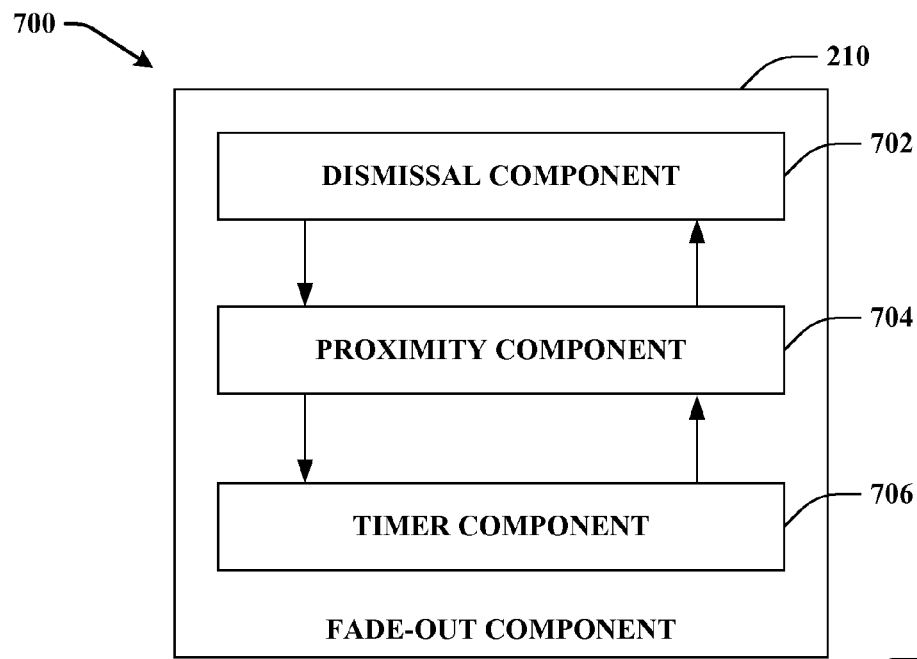
FIG. 7 provides a more detailed depiction of a fade-out component that facilitates and effectuates efficient and flexible selection of display objects in accordance with an aspect of the claimed subject matter.

FIG. 7 provides a more detailed depiction 700 of fade-out component 210 in accordance with the claimed subject matter. As illustrated fade-out component can include dismissal component 702, proximity component 704, and timer component 706. Regardless of the quality of fade-in component 202 there will be instances when an unwanted handle fades in. Accordingly, dismissal component 702 provides a mechanism that is sensitive enough that unwanted handles can be easily dismissed without interrupting the user's flow of interaction, but not too sensitive as to cause desired handles to unexpectedly fade out as the user approaches them. Thus, to effectuate its ends, dismissal component 702, individually or in conjunction with proximity component 704 and timer component 706, unobtrusively dismisses unwanted handles.

Generally, dismissal component 702 can utilize proximity component 704 in order to ascertain whether pointing instrumentality is moving towards or away from a handle. Typically, handle flags should fade out if at anytime the pointing instrumentality moves away from the handle flag by a distance, for example, 35 pixels. Nevertheless, some leniency can be provided when the pointing instrumentality backtracks from its initial movement (e.g., when users second guess their initial movements and backtracked, even though they were heading towards the correct handle). Leniency can also be provided to allow users to take curved approaches to the handle. Accordingly, proximity component 704 can determine a distance metric D defined as the minimum of two distances: (1) from the pointing instrumentality location to the handle rectangle, and (2) from the pointing instrumentality location to the handle flag line segment, excluding, for example, the first 20 pixels. Thus, if the pointing instrumentality is within the rectangle, proximity component 704 can set D to 0.

Since each handle flag can keep track of the distance at the current time $D_t$, and the minimum value minD that $D_t$ has taken since the handle flag was visible (t=0), proximity detector 704 and timer component 706 can provision handle flags with such information. Thus, for example, if at any time $D_t > min_D + 35$, then handle flag will fade out. By including the distance to the flag line segment users can backtrack without penalty. By not using, for example, the first 20 pixels of the flag line segment, $D_0$ can be initialized to 20 instead of 0. This means upon initialization $D_t$ can be, for instance, up to 55 pixels, instead of just 35 pixels; enough to allow users to adopt a curved approach to the desired handle.

Figure 8:
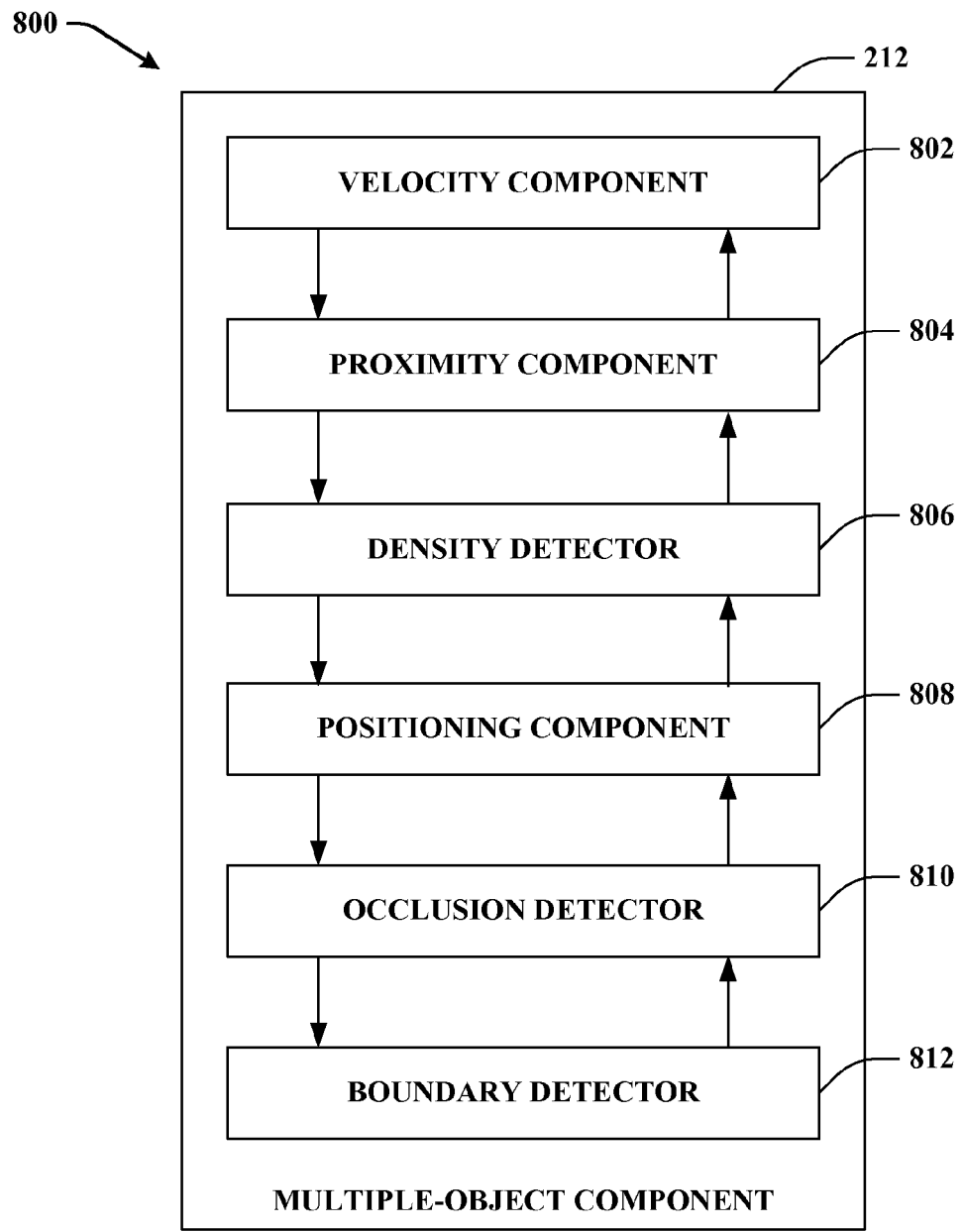
FIG. 8 provides a more detailed depiction of a multiple-object component that facilitates and effectuates efficient and flexible selection of display objects in accordance with an aspect of the claimed subject matter.

FIG. 8 provides a more detailed depiction 800 of multiple-object component 212 in accordance with an aspect of the claimed subject matter. As illustrated, multiple-object component 212 can include velocity component 802, proximity component 804, density detector 806, positioning component 808, occlusion detector 810, and boundary detector 812. Velocity component 802 can determine when a pointing instrumentality controlled by a user drops below a threshold velocity in an area determined by proximity component 804 and density detector 806 as being object rich (e.g., an area containing multiple ink strokes). In such object rich areas separate handles can be associated with each of these objects, and as such handle flags can be displayed for each object. In an object rich area if all handle flags were to be to be displayed without constraint an impenetrable clutter could ensue making it difficult or impossible for users to select objects. Accordingly, velocity component 802, proximity component 804, and density component 806 can determine whether or not the velocity of a pointing instrumentality falls below a threshold value within a region, or close to an area, associated with multiple objects (e.g., an area where the density of objects exceeds a threshold value). Where it is determined that such an event has occurred, positioning component 808 can be utilized to determine an appropriate location in which to display an associated handle flag. Positioning component 808 can initially attempt to position the handle in a default position, for example, assuming the user is right handed, 50 pixels down and to the left of the object at issue. Thereafter, occlusion detector 810 can be utilized to determine whether or not such a position occludes another handle. Positioning component 808 and occlusion detector 810 in conjunction can iterate in this manner through possible locations, until a position which does not cause an occlusion is found.

By ensuring that the handle is always down and to the left, or in the case of left handed individuals to the right, the user can start their initial movement towards the handle, without knowing its exact position. This allows the cost of the visual search and decision times to be integrated with the time taken to acquire the target. Such would not be possible in alternative techniques, such as the splatter approach, where the objects are positioned radially around a start location.

Further, in recognition that handle flags can be inaccessible when objects are situated close to a screen border, multiple-object component 212 can employ boundary detector 812. Boundary detector 812 can detect screen borders and thereafter can provide indication to positioning component 808 to modify the default offset vector utilized to ensure that all handle flags can be accessible. For example, where boundary detector 812 detects the bottom right screen border, handles can be positioned by positioning component 808 up and to the left.

Figure 9:
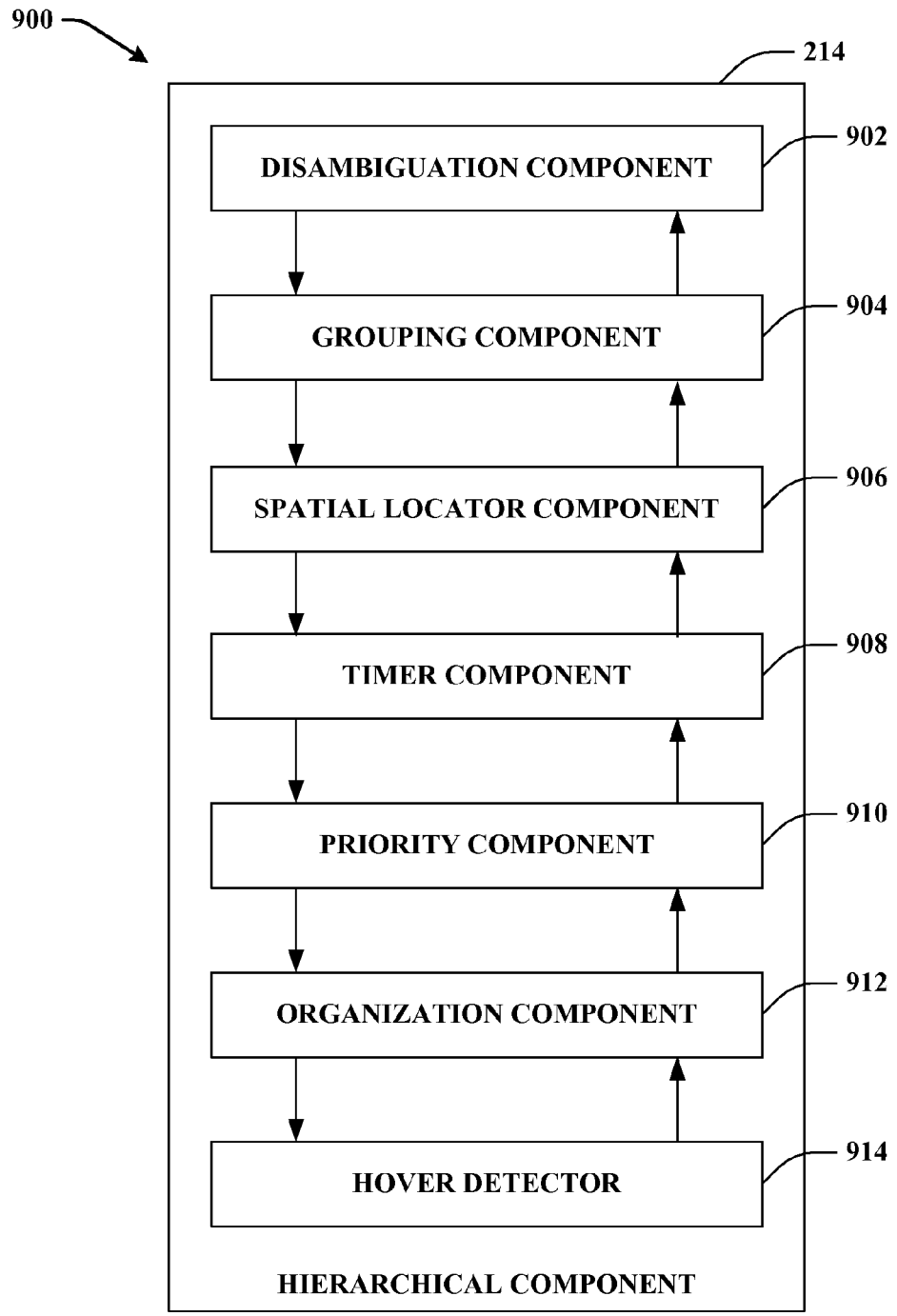
FIG. 9 provides a more detailed depiction of a hierarchical component that facilitates and effectuates efficient and flexible selection of display objects in accordance of yet another aspect of the claimed subject matter.

FIG. 9 provides a more detailed depiction 900 of hierarchical component 214 in accordance with an aspect of the claimed subject matter. While in some cases users may want to select individual objects, it is reasonable to assume the more common task will be selecting higher level structures consisting of multiple objects, such as words or diagrams. Stated differently, each individual object (e.g., a stroke in the inking context) can be an element of multiple potential selections.

To give the user the flexibility to select and work with any of these potential selections, a disambiguation component 902 can be utilized that disassembles objects into their lowest reducible form. For example, the character "H" can be reduced to two vertical stokes connected by a horizontal stoke situated approximately midway between the two up right stroke. Thus, the lowest reducible form that the character "H" can be disassembled to is three stokes (e.g., two upright stokes and an interconnecting horizontal one). Each of the disassembled objects can be a potential selection and can be associated with a handle flag. Note however that these potential selections can diverge from the typical idea of a group for two reasons. First, the potential selections generally do not need to form a strict hierarchy, as groups typically do. For example, stroke "B" could belong to potential selections "AB" or "BC". Second, no stroke properties are stored by the potential selections, as they can be by a group—the handle flags are typically used to provide users with a quick way to select associated objects (e.g., ink strokes).

As stated earlier, there can be three types of potential selections which can exist in the claimed subject matter: (1) selections created and accessed by the user; (2) selections formed by the system; and (3) individual objects or strokes. Selections of type (2) typically would be the groups that inking applications usually form based on the spatial structure of user input. Thus, hierarchical component 214, in addition to disambiguation component 902, can include grouping component 904 that can group objects (e.g., strokes) together based at least in part on an spatial location as determined by spatial locator component 906 and a time of creation as provided by timer component 908.

Since displaying all handle flags for potential selections associated with disassembled objects can result in the screen becoming quickly cluttered, making it difficult for the user to find a correct handle flag, hierarchical component 214 can utilize priority component 910 which can establish an appropriate ordering. One illustrative ordering can be that selections last used are given the highest priority, followed by selections inferred by the system, and individual objects or strokes given the lowest priority by priority component 910. Moreover, priority component 910 can revise the established ordering whenever a selection is used, bringing that selection to the top priority.

To give users access to selections lower on the ordering, hierarchical component 214 can provide organization component 912 that can organize handle flags into a hierarchy, linking them by subset and superset relationships. The definition of subset and superset handle flags can be based, for example, on the set of individual objects or strokes associated with the handle flags they represent. Then in conjunction with hover detector 914, when a user utilizing a pointing instrumentality hovers the instrumentality over an object or stroke, only handle flags which do not have subset or superset handles with higher priority can be displayed (e.g., at the root level). Such an approach guarantees that the handle flag of the highest priority can be displayed. Furthermore, only this handle can be displayed, unless a handle flag with an intersecting selection exists. To access different selections, the user can hover the pointing instrumentality over one of the handles at the root level. Using fade-in component 202 thereafter, this handle can then be expanded to show handle flags that are strict subsets below, and handle flags which are strict supersets above (e.g., the term strict referring, without limitation, to the fact that no intermediate handle flags exist). Thus, through use of hierarchical component 212, and in particular, organization component 912 and hover detector 914, a user can traverse the entire hierarchy. To prevent users from getting lost in an endless path, only the root level nodes can be expanded both upwards and downwards, for instance. Remaining intermediate nodes can, for example, only expand in the same direction of their parent edge.

Figure 10:
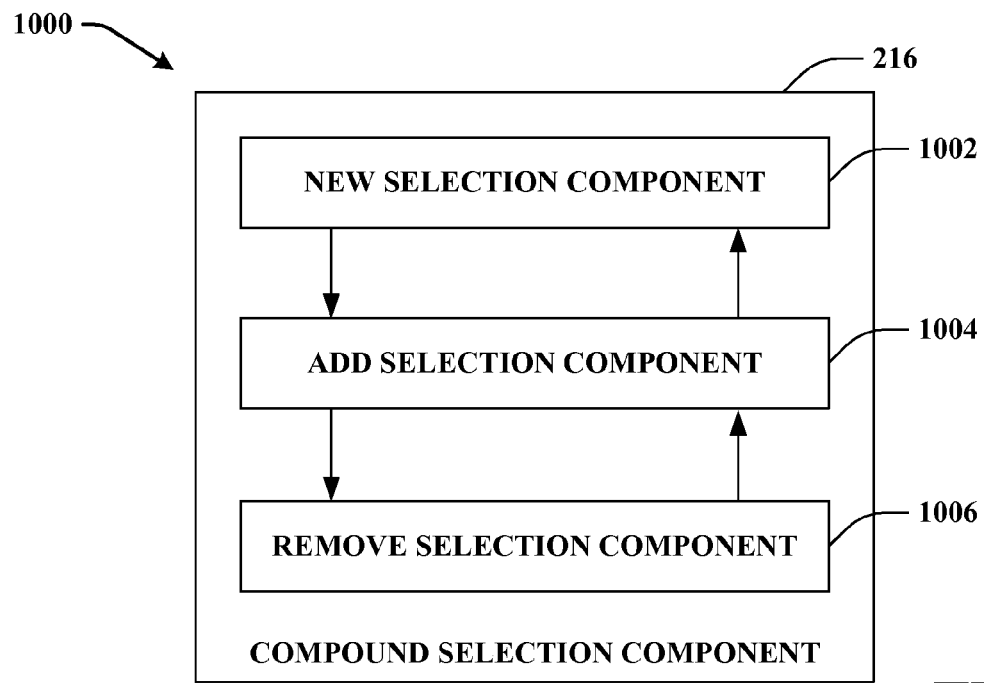
FIG. 10 provides a more detailed depiction of a compound selection component that facilitates and effectuates efficient and flexible selection of display objects in accordance with an aspect of the subject matter as claimed.

FIG. 10 provides a more detailed depiction 1000 of compound selection component 216. As illustrated compound selection component 216 can include new selection component 1002, add selection component 1004, and remove selection component 1006. On activating a handle flag's menu, users can choose from three selection options—new selection, add to selection, and remove from selection. This can give the user the flexibility to alter the scope of the selection after it is initially made. For example, if a user were to initially selection object "1" with new selection component 1002, and then objects "2" and "3" with add selection component 1004. A compound object comprising objects "1", "2", and "3" can be formed. From this compound object, user can subsequently remove object "2" though utilization of remove selection component 1006, thus leaving a compound object comprising objects "1" and "3". To make this a quick interaction, the distance metric utilized by the fade-out component 210 can be reset each time a selection from the pop-up menu is made. This means any handle visible before using the menu can still be visible.

While the add selection component 1004 can allow users to create a new selection which did not previously exist, it can sometimes be easier to simply utilize a lasso gesture to encircle the object(s) at issue. As such handle flags can be viewed as being complementary to the lasso tool. Handle flags are typically most beneficial when the desired selection already exists. Where however a desired selection does not exist, or where the user does not realize the nonexistence of the selection until after they have taken the time to display the handle flags, compound selection component 216 can cause a small lasso icon to be faded in, so that if a user hovers over the handle flag for a predetermined amount of time, for example 0.4 seconds, the small lasso icon can be displayed. Display of the lasso tool icon provides users in-place access to the lasso tool, so the time taken to display the handle flag is not completely wasted. Once clicking on the lasso icon, users can make their desired selection through use of the lasso. After the lasso stroke, the system can return to a default object insertion mode (e.g., default inking mode).

Once a selection has been made via component associated with compound selection component 216, color can be associated with selected objects as desired. Such color can for example, be rendered in an outline style, and a dashed bounding box drawn around the selection. A selection handle can thereafter be attached to its border. Tapping, for instance, on the selection handle can bring up a pop-up menu with options that will act on the entire selection scope. If a command is performed on the selection, the system can add a handle flag for the current selection scope, and bring it to the top of the priority list.

Figure 11:
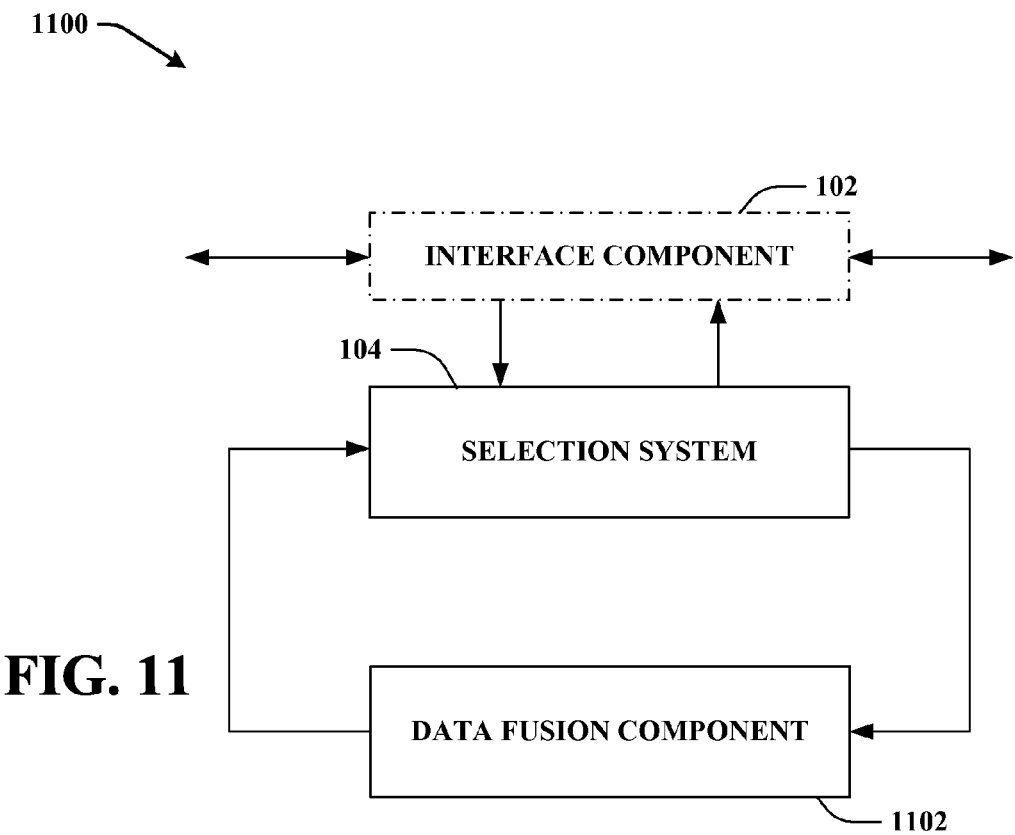
FIG. 11 depicts a machine-implemented system that effectuates and facilitates efficient and flexible selection of display objects in accordance with an aspect of the claimed subject matter.

FIG. 11 provides yet a further depiction of a system 1100 that and facilitates efficient and flexible selection of display objects in accordance with an aspect of the claimed subject matter. As depicted, system 1100 can include a data fusion component 1102 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 1102 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 12:
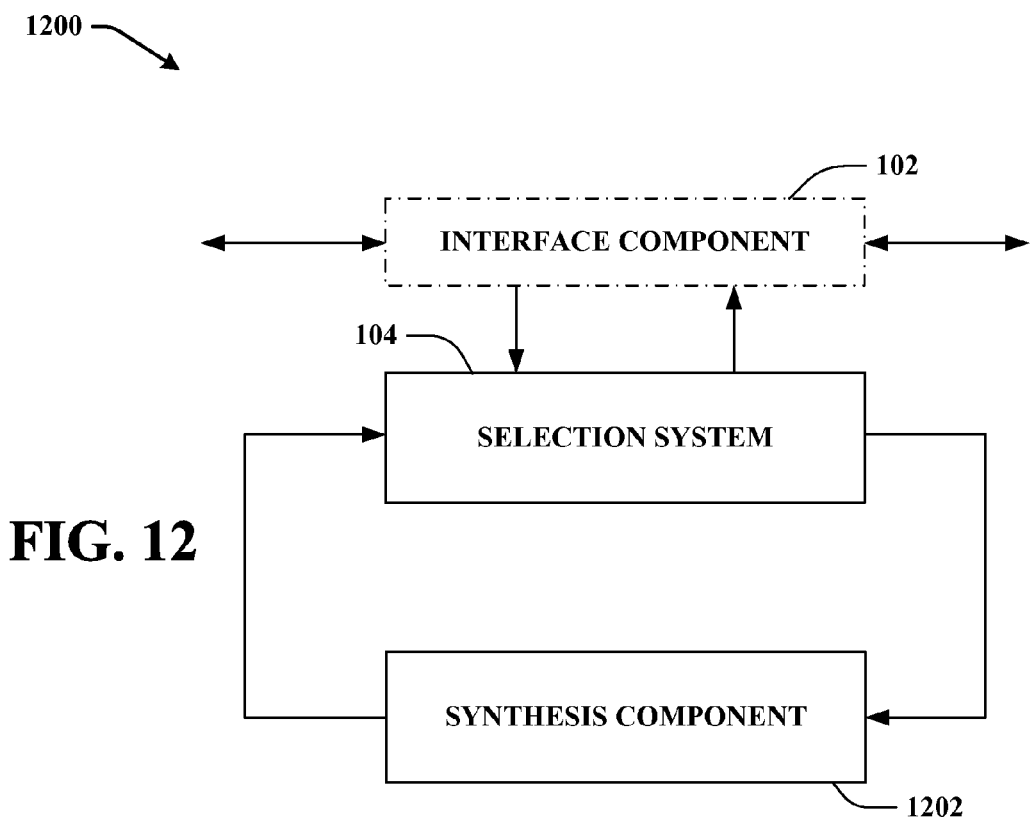
FIG. 12 illustrates a machine-implemented system that effectuates and facilitates efficient and flexible selection of display objects in accordance with an aspect of the claimed subject matter.

FIG. 12 provides a further depiction of a system 1200 that and facilitates efficient and flexible selection of display objects in accordance with an aspect of the claimed subject matter. As illustrated selection system 104 can, for example, employ synthesizing component 1202 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 1202 through combining and filtering can provide a set of information that can be more informative, or accurate (e.g., with respect to an entity's communicative or informational goals) and information from just one or two modalities, for example. As discussed in connection with FIG. 11, the data fusion component 1102 can be employed to learn correlations between different data types, and the synthesizing component 1202 can employ such correlations in connection with combining, or filtering the input data.

Figure 13:
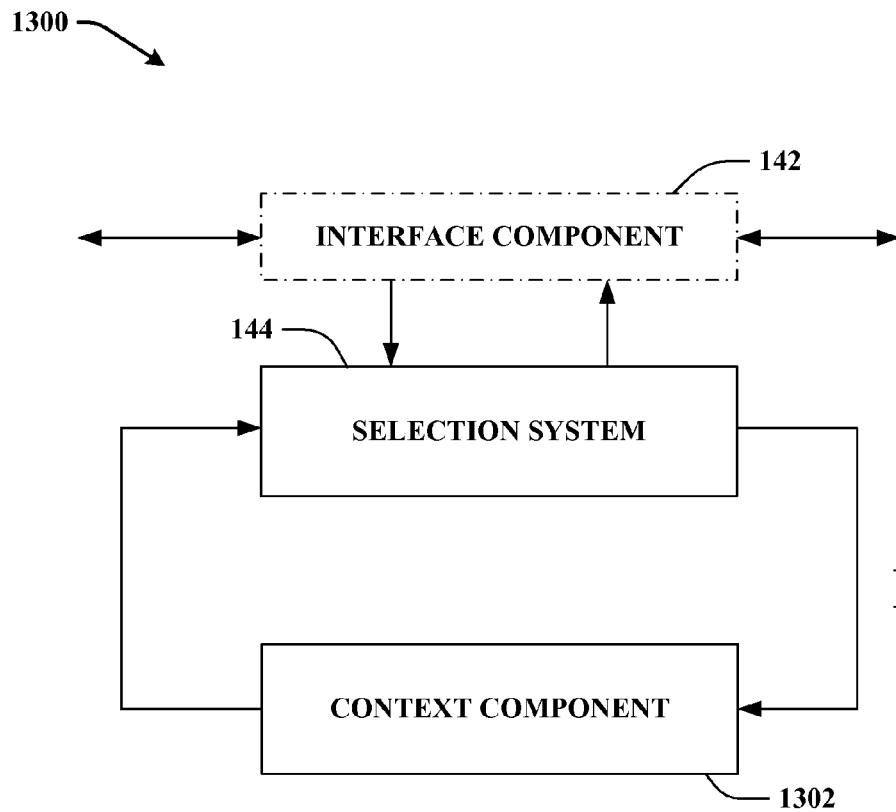
FIG. 13 depicts a machine-implemented system that effectuates and facilitates efficient and flexible selection of display objects in accordance with an aspect of the claimed subject matter.

FIG. 13 provides a further illustration of a system 1300 that facilitates efficient and flexible selection of display objects in accordance with an aspect of the claimed subject matter. As illustrated selection system 104 can, for example, employ context component 1302 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 1302 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and stake). Knowledge that it is near dinnertime of the user as compared to the user camping would greatly help in recognizing the following spoken words "I need a steak/stake". Thus, if the context component 1302 had knowledge that the user was not camping, and that it was near dinnertime, the utterance would be interpreted as "steak". On the other hand, if the context component 1302 knew (e.g., via GPS system input) that the user recently arrived at a camping ground within a national park; it might more heavily weight the utterance as "stake".

In view of the foregoing, it is readily apparent that utilization of the context component 1302 to consider and analyze extrinsic information can substantially facilitate determining meaning of sets of inputs.

Figure 14:
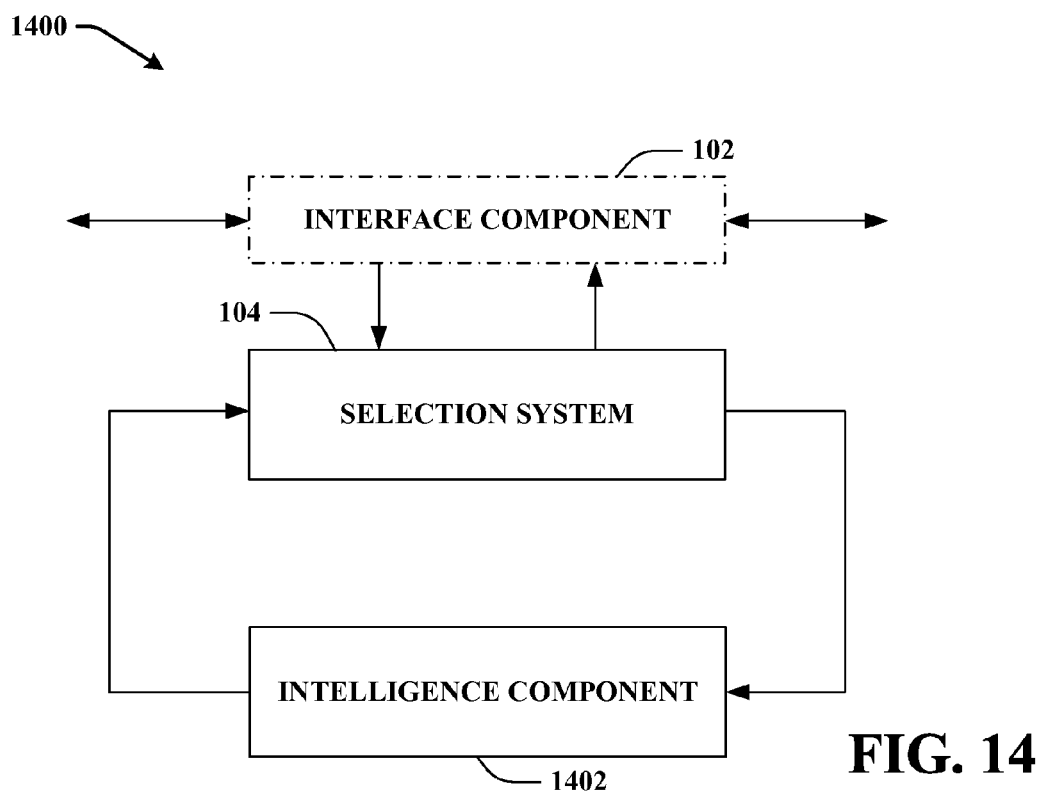
FIG. 14 illustrates a machine-implemented system that effectuates and facilitates efficient and flexible selection of display objects in accordance with an aspect of the claimed subject matter.

FIG. 14 depicts a system 1400 that employs artificial intelligence to facilitate efficient and flexible selection of display objects in accordance with an aspect of the subject matter as claimed. Accordingly, as illustrated, system 1400 can include an intelligence component 1402 that can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 1402 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 1402 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 15:
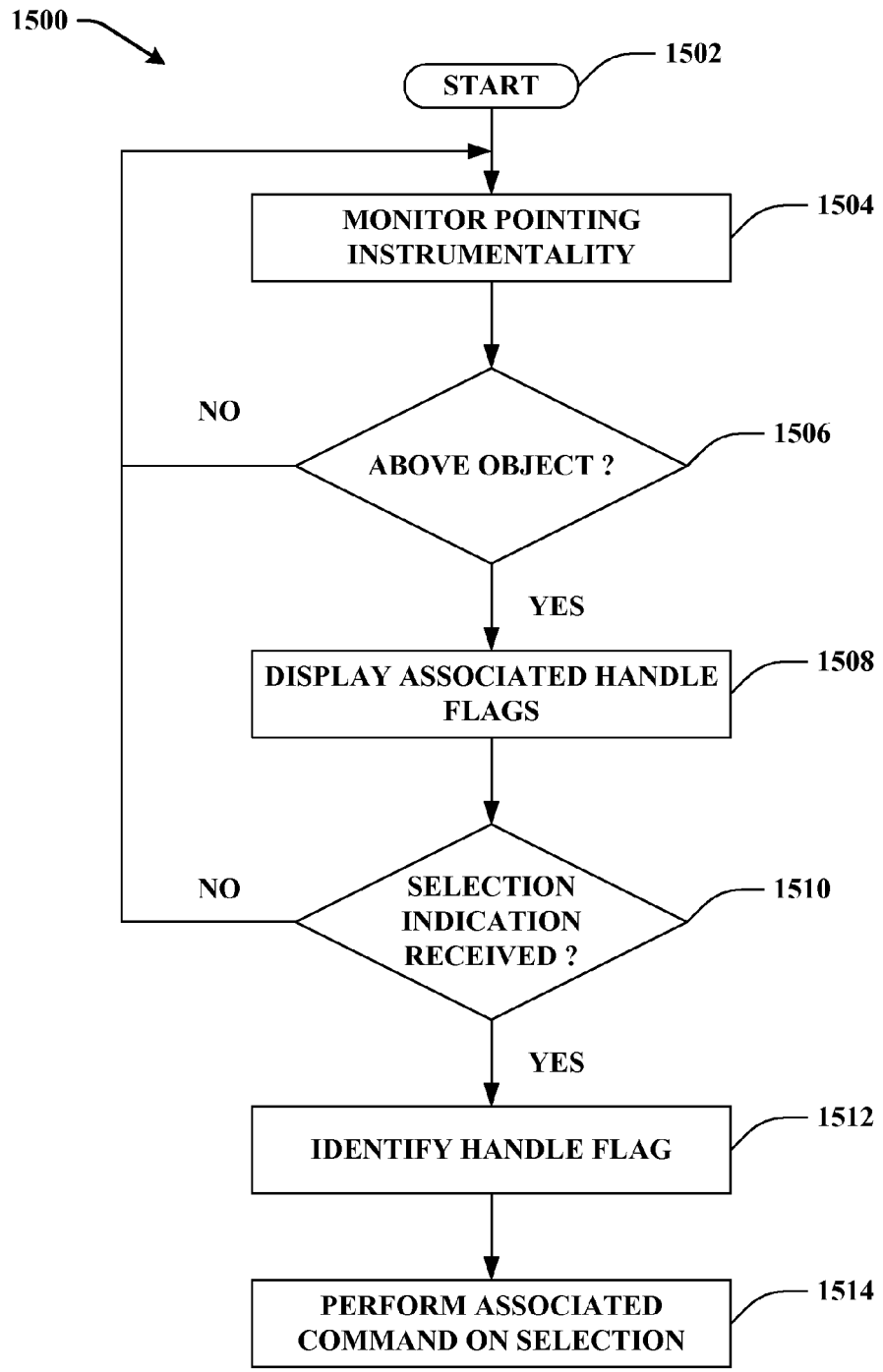
FIG. 15 illustrates a flow diagram of a machine implemented methodology that effectuates and facilitates efficient and flexible selection of display objects in accordance with an aspect of the claimed subject matter.

In view of the exemplary systems shown and described supra, methodologies that may be implemented in accordance with the disclosed subject matter will be better appreciated with reference to the flow chart of FIG. 15. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 15 illustrates a flow diagram of a machine implemented method 1500 that facilitates and effectuates efficient and flexible selection of display objects in accordance with an aspect of the claimed subject matter. Method 1500 can commence at 1502 whereupon various and sundry initialization tasks can be performed. Upon completion of the initialization tasks methodology 1500 can proceed to 1504 where monitoring of pointing instrumentality controlled by users can be undertaken. At 1506 a determination can be made as to whether the pointing instrumentality controlled by the user is in the vicinity of, or is over a particular object (e.g., ink strokes). If the pointing instrumentality is in close proximity to, or is above a particular object (e.g., YES), methodology 1500 can proceed to 1508 where handle flags associated with the particular object can be displayed so that no two handle flags that can be associated with the object occlude one another. Alternatively, if at 1506 the pointing instrumentality is not in the vicinity of, or is not above a particular object (e.g., NO), the method can cycle back to 1504. At 1510 a determination can be made as to whether a selection indication has been received from a user. A selection indication can take the form of a gesture (e.g., double clicking a mouse button, tapping a stylus on a surface, utilizing a flicking motion, etc.). Typically a selection indication can be received where the user wishes to perform selections associated with a displayed handle flag. Where a selection indication is not received (e.g., NO) at 1510, the method can return to 1504. Where a selection indication is received at 1510 (e.g., YES) methodology 1500 can proceed to 1512 where the handle flag to which the selection indication is affiliated can be identified. Once the handle flag has been appropriately identified, commands associated with the handle flag and selected by the user can be performed at 1514.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 16:
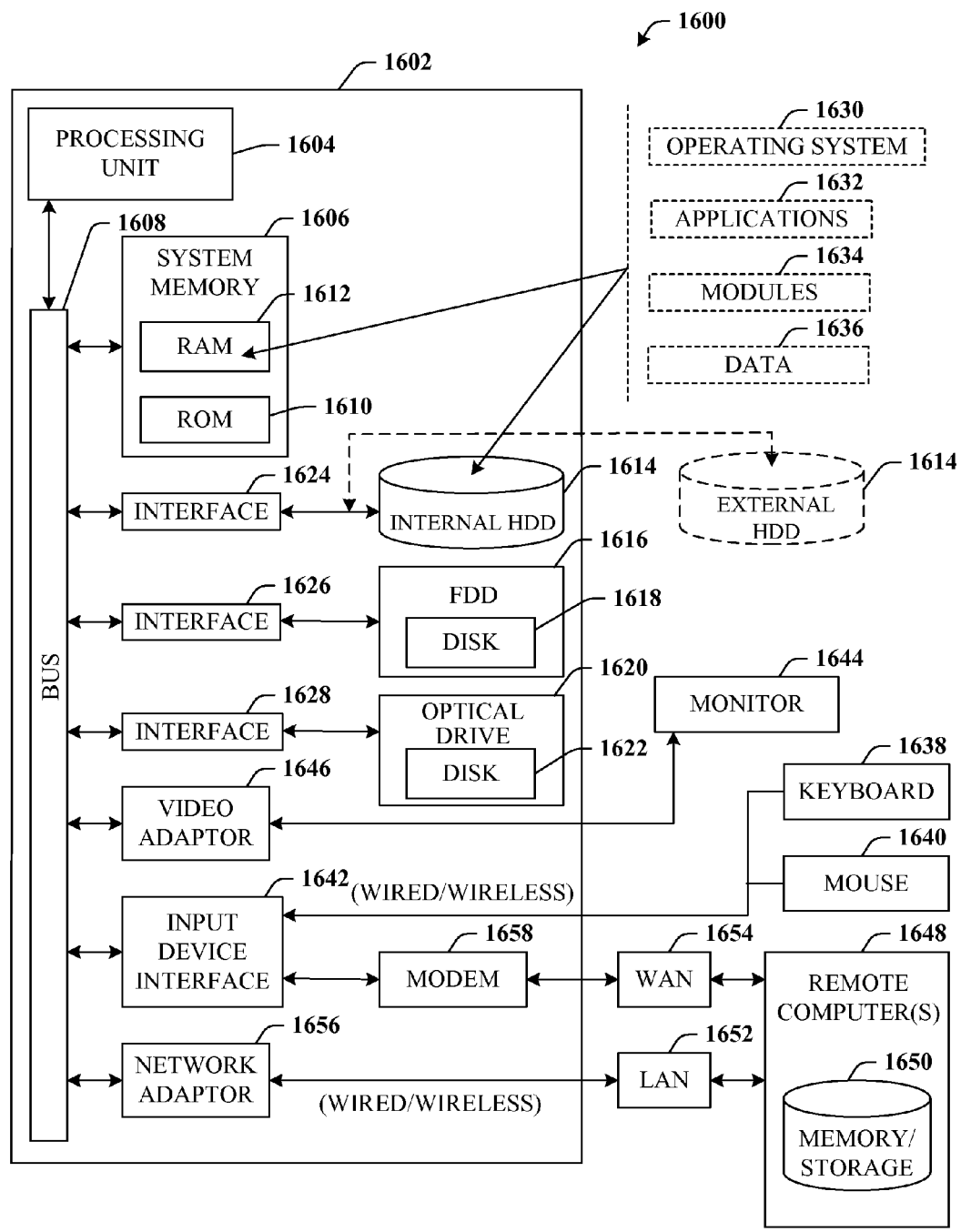
FIG. 16 illustrates a block diagram of a computer operable to execute the disclosed system in accordance with an aspect of the claimed subject matter.

Referring now to FIG. 16, there is illustrated a block diagram of a computer operable to execute the disclosed system. In order to provide additional context for various aspects thereof, FIG. 16 and the following discussion are intended to provide a brief, general description of a suitable computing environment 1600 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 16, the exemplary environment 1600 for implementing various aspects includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1694 interface technologies. Other external drive connection technologies are within contemplation of the claimed subject matter.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the claimed subject matter can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1694 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 17:
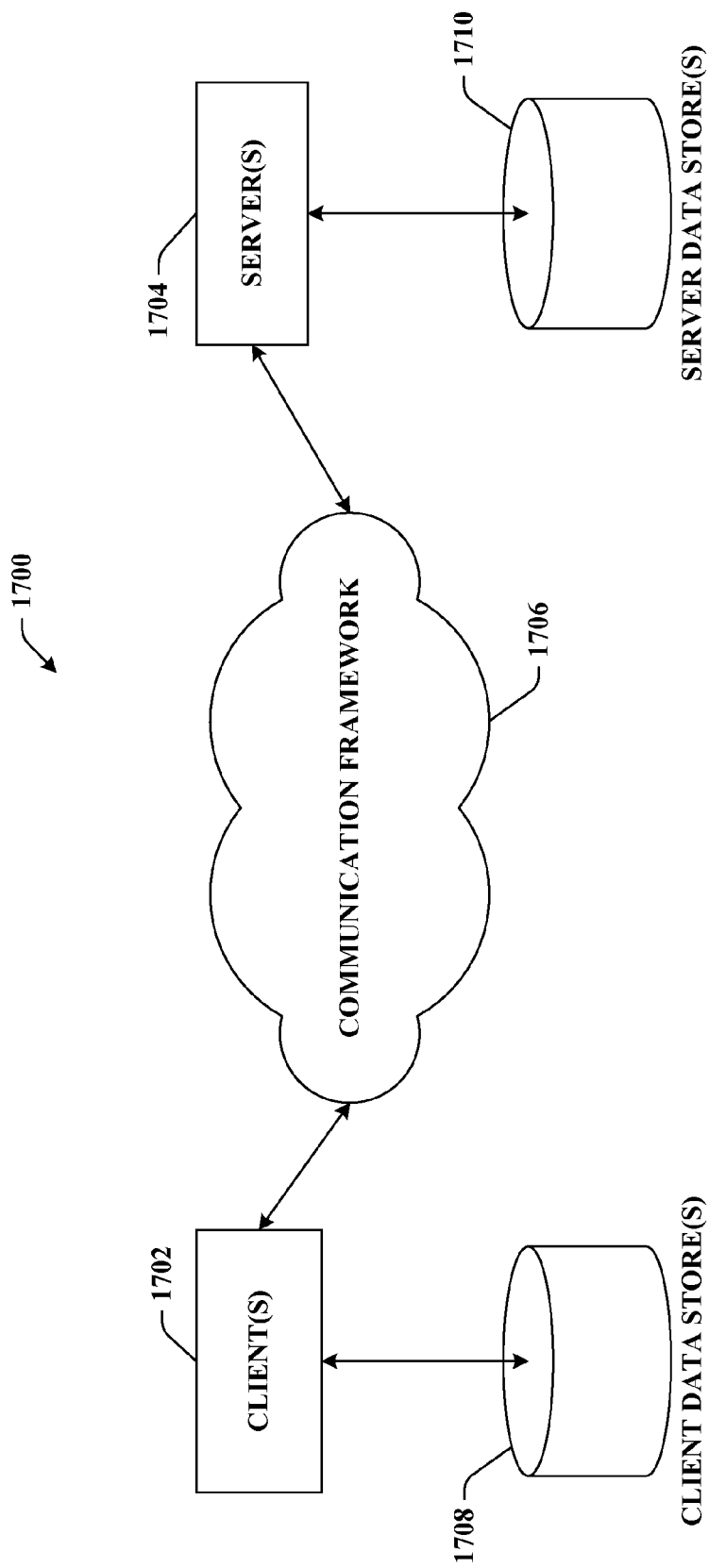
FIG. 17 illustrates a schematic block diagram of an exemplary computing environment for processing the disclosed architecture in accordance with another aspect.

Referring now to FIG. 17, there is illustrated a schematic block diagram of an exemplary computing environment 1700 for processing the disclosed architecture in accordance with another aspect. The system 1700 includes one or more client(s) 1702. The client(s) 1702 can be hardware and/or software (e.g., threads, processes, computing devices). The client(s) 1702 can house cookie(s) and/or associated contextual information by employing the claimed subject matter, for example.

The system 1700 also includes one or more server(s) 1704. The server(s) 1704 can also be hardware and/or software (e.g., threads, processes, computing devices). The servers 1704 can house threads to perform transformations by employing the claimed subject matter, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that effectuates and facilitates efficient and flexible selection of display objects, comprising:
    a processor;
    memory communicatively coupled to the processor;
    a component stored in the memory and executable by the processor to:
        receive from an interface an input gesture related to a display object that is presented on a visual display,
        determine a velocity and a proximity of the input gesture in relation to the display object,
        compare the determined velocity of the input gesture to a velocity threshold,
        compare the determined proximity of the input gesture to a proximity threshold,
        display one or more selection flags associated with the display object when the determined velocity of the input gesture exceeds the velocity threshold or when the determined proximity is less than the proximity threshold, and
        inscribe a line originating from a point on the display object closest to an initial location of a pointing instrumentality oriented toward the one or more selection flags,
    wherein
        the one or more selection flags correspond to a hierarchy of selectable constituent parts of the display object that are available for potential selection, and
        the one or more selection flags comprise one or more thumbnail images of the display object, the one or more thumbnail images being sized proportionally to a bounding box circumscribing the display object.

2. The system of claim 1, wherein the component is further configured to determine whether the proximity of the input gesture falls within an area that circumscribes the display object.

3. The system of claim 1, wherein the input gesture is provided via utilization of a pointing instrumentality.

4. The system of claim 3, wherein the pointing instrumentality comprises a pen, a mouse, or a pressure point imposed by a stylus or a human finger.

5. The system of claim 1, wherein the display object is included in a subset of alternate display objects.

6. The system of claim 1, wherein the display object comprises a superset of all display objects presented on the visual display.

7. The system of claim 1, wherein the one or more selection flags are configured to fade into the visual display when the velocity or the proximity of the gesture in relation to the display object falls within established thresholds.

8. The system of claim 1, wherein the one or more selection flags are configured to fade out when the velocity or the proximity of the input gesture in relation to the display object fall outside established thresholds.

9. A machine implemented method that effectuates and facilitates efficient and flexible selection of display objects, comprising:
    receiving an input gesture related to a display object presented on a visual display;
    ascertaining a velocity or a proximity of the input gesture relative to the display object; and
    displaying a selection flag associated with the display object based at least on the velocity or the proximity of the input gesture, the selection flag including a thumbnail image of the display object and an attribute indicating a time that the selection flag has been visible.

10. The method of claim 9, further comprising situating the selection flag associated with the display object in display real estate to prevent overlapping of a plurality of alternative flags associated with the display object.

11. The method of claim 9, wherein the attribute indicating a time that the selection flag has been visible is utilized to determine a backtrack leniency parameter that is utilized to prevent unexpected flag fade in or unexpected flag fade out.

12. The method claim 9, further comprising monitoring for indications provided by a user that activation of a command associated with the selection flag is desired.

13. The method of claim 12, wherein the activation of the command associated with the selection flag includes instigating a radial pop-up menu to display.

14. The method of claim 9, further comprising spatially situating the selection flag to prevent the flag from occluding one or more other selection flags.

15. The method of claim 9, wherein the selection flag includes an attribute indicating a distance at a current time.

16. A system that effectuates efficient and flexible selection of display objects, comprising:
    a processor; and
    memory coupled to the processor;
    a proximity component stored in the memory and executable on the processor that acquires movement associated with a pointing instrumentality;
    a multiple-object component stored in the memory and executable on the processor that determines an associated velocity or an associated proximity of the movement in relation to a display object presented on a visual display;
    a hierarchical component stored in the memory and executable on the processor that dissects the display object into one or more selectable constituent parts and constructs a hierarchy of the one or more selectable constituent parts for selection; and
    a flag-in component stored in the memory and executable on the processor that displays one or more selection flags affiliated with the display object based at least in part on the associated velocity or the associated proximity falling below a velocity threshold or within an area surround the display object, the one or more selection flags corresponding to the one or more selectable constituent parts of the display object, and each selection flag of the one or more selection flags including a thumbnail image of the corresponding selectable constituent part of the display object and an attribute indicating a time that the respective selection flag has been visible.

* * * * *